US008214897B2

(12) United States Patent
Malkin et al.

(10) Patent No.: US 8,214,897 B2
(45) Date of Patent: Jul. 3, 2012

(54) SYSTEM AND METHOD FOR USAGE-BASED MISINFORMATION DETECTION AND RESPONSE

(75) Inventors: Peter Kenneth Malkin, Ardsley, NY (US); Thomas David Erickson, Minneapolis, MN (US); Brent Tzion Hailpern, Katonah, KY (US); Wendy Anne Kellogg, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 231 days.

(21) Appl. No.: 12/191,501

(22) Filed: Aug. 14, 2008

(65) Prior Publication Data

US 2008/0301295 A1 Dec. 4, 2008

Related U.S. Application Data

(63) Continuation of application No. 11/343,629, filed on Jan. 31, 2006, now abandoned.

(51) Int. Cl.
*H04L 29/06* (2006.01)

(52) U.S. Cl. ............... 726/22; 726/1; 726/23; 726/26; 709/224; 705/14.4; 705/14.41; 705/14.42; 705/14.44; 705/14.45

(58) Field of Classification Search .............. 726/3–30, 726/1; 709/223–225; 705/14.4–14.45
See application file for complete search history.

(56) References Cited

U.S. PATENT DOCUMENTS

| 6,408,391 | B1* | 6/2002 | Huff et al. .................... 726/22 |
| 6,704,874 | B1* | 3/2004 | Porras et al. .................. 726/22 |
| 6,769,066 | B1* | 7/2004 | Botros et al. .................. 726/23 |
| 6,785,820 | B1* | 8/2004 | Muttik et al. .................. 726/24 |
| 6,963,983 | B2* | 11/2005 | Munson et al. .................. 726/5 |
| 7,373,524 | B2* | 5/2008 | Motsinger et al. ............ 713/194 |
| 7,383,578 | B2* | 6/2008 | Blake et al. .................... 726/23 |
| 7,475,426 | B2* | 1/2009 | Copeland, III ................. 726/23 |
| 2001/0051885 | A1* | 12/2001 | Nardulli et al. ................... 705/6 |
| 2005/0005168 | A1* | 1/2005 | Dick ........................... 713/201 |
| 2006/0075494 | A1* | 4/2006 | Bertman et al. ................. 726/22 |

OTHER PUBLICATIONS

Semantic Attacks—A new Wave of Cyber terrorism; Author: Deri Jones; Publisher: NTA Monitor; Date: Apr. 8, 2002.*
Competitive Intelligence and the Web by Robert J. Boncella; Date: Sep. 29, 2003; Publisher: Communications of the Association for Information Systems.*
Cognitive Hacking: Technological and Legal Issues by Cybenko et al; Published by Dartmouth College, Hanover, NH, US; Year: 2002.*

* cited by examiner

*Primary Examiner* — Taghi Arani
*Assistant Examiner* — Madhuri Herzog
(74) *Attorney, Agent, or Firm* — Scully, Scott, Murphy & Presser, P.C.; Vazken Alexanian

(57) ABSTRACT

Methods of detecting, and providing a notification of, the existence of misinformation using usage patterns of a network service enable an organization to respond to the misinformation. The method includes establishing common usage patterns of the network service, identifying an irregular usage pattern, determining that the irregular usage pattern was caused by misinformation, and responding to the misinformation.

19 Claims, 5 Drawing Sheets

SYSTEM AND METHOD FOR USAGE-BASED MISINFORMATION DETECTION AND RESPONSE

CROSS REFERENCE TO RELATED APPLICATIONS

The present application is a continuation application of U.S. Ser. No. 11/343,629, filed Jan. 31, 2006, the entire contents of which are incorporated herein by reference.

TECHNICAL FIELD

The invention relates generally to electronic or network based detection and notification systems for organizations or like entities, and more particularly to early detection and notification of misinformation related to a given organization.

BACKGROUND OF THE INVENTION

Negative publicity is of great concern to consumer organizations, especially when the negative publicity is accessible to the public via a network. One particular form of negative publicity is misinformation, which includes unintentionally posted incorrect data, maliciously posted incorrect data (referred to as "disinformation"), and private data (i.e. data that is inadvertently disclosed, such as reduced prices provided to special customers, for example).

In addition to reducing a given organization's popularity, misinformation can mislead customers. For example, an incorrectly posted URL for a particular company will prevent consumers from accessing the company's website. As another example, a false report regarding faulty software can reduce a customer's trust in the company and engender decrease or loss of any good will the company may have built.

Several attempts have been made to develop systems and methods for automated detection of and response to misinformation. For example, virus detection systems, such as the Antivirus product from Symantec, are able to find and eliminate software explicitly designed to disrupt machine and network operations, but do not provide a way of identifying false or misleading data, only dangerous programs.

There are network monitoring systems, such as the Netcool Suite™ from Micromuse Network Solutions, San Francisco, Calif., that are able to identify hardware and software errors as well as operation problems (e.g., network overload,). Another monitoring system called NetRanger™ by Cisco monitors network traffic posting alerts whenever network-based intrusions (e.g., denial-of-service attacks) are detected. Such applications are still not able to identify the presence of misinformation. Web log analysis enables identification of server and network malfunctions, but does not enable the detection of misinformation. Search engines (e.g., Google) have been be used to retrieve postings from multiple sources (e.g., web sites, newsgroups and chat groups) relevant to a particular topic (e.g., "IBM spamming spammers"), but do not enable the identification of misinformation.

Chat group moderators are able to monitor all activity and content within their chat group, but have no means of determining whether changes in local activity patterns are due to misinformation. Corporate public relations and branding specialists are able to determine whether a given statement/article is misinformation, but they have no way to be quickly and automatically notified by one of their organization's network servers of instances of potential misinformation. Buzz detection systems, such as those provided by IBM's WebFountain™ are able to estimate and characterize the public's reaction to a given product by reviewing and comparing both structured (e.g., web pages) and unstructured data (e.g., chat room conversations) related to the given product. Such systems do not provide a way of identifying and providing notification of misinformation.

SUMMARY OF THE INVENTION

The invention relates generally to electronic or network based detection and notification systems for organizations or like entities, and more particularly to early detection and notification of misinformation related to a given organization.

In one aspect, the invention involves a method of detecting, and providing a notification of, the existence of misinformation using usage patterns of a network service. The method includes establishing common usage patterns of the network service, identifying an irregular usage pattern, determining that the irregular usage pattern was caused by misinformation, and responding to the misinformation.

In one embodiment, the method further includes determining the source of the misinformation. In another embodiment, responding to the misinformation includes one or more of: modifying the network service to accommodate misinformation, asking the source of misinformation for correction or retraction, providing results for searches regarding misinformation, posting an entry in an online discussion forum explaining the misinformation, or notifying a group responsible for public relations, CRM, or product branding of misinformation so that the group can react. In yet another embodiment, the usage patterns include known pulses and idle time, known content, and max, min, average and mean usage levels. In still another embodiment, misinformation includes a false quote, a false fact, or a false URL.

According to another aspect, the invention involves a method of detecting abnormal use of a network service caused by misinformation. The method includes determining common usage patterns for the network service, monitoring the usage patterns of service to detect abnormal usage patterns, and determining if the abnormal usage patterns were caused by misinformation.

In one embodiment, abnormal usage includes requests for a non-existent URL. In another embodiment, abnormal usage includes a large number of searches within the network service, which do not match any of the network service's data. In yet another embodiment, monitoring the usage patterns of service to detect abnormal usage patterns is manually performed. In still another embodiment, different users monitor different aspects of the network service. In another embodiment, an automatic misinformation recognition agent requests an authorized user to determine if a given abnormal usage pattern was caused by misinformation. In other embodiments, an automatic misinformation response agent requests that an authorized human determine how to handle a given misinformation incident. In still other embodiments, specific third party services are checked for usage indicating misinformation. In another embodiment, activities of a specific user are checked for behavior indicating misinformation. In yet another embodiment, determining if the abnormal usage patterns were caused by misinformation includes checking for correlations between specific activity and patterns of activity to reveal misinformation. In other embodiments, correlations include one or more of actions of a particular user, numerous searches for a particular topic, searches that fail to return any results, action level or content in a third party service, reduced or low levels of one or more activities, or hits from a particular source. In still another embodiment, the network service includes one or more online servers.

According to still another aspect, the invention involves a system for detecting, and providing a notification of, the existence of misinformation using usage patterns of a network service. The system includes means for establishing common usage patterns of the network service, means for identifying an irregular usage pattern, means for determining that the irregular usage pattern was caused by misinformation, and means for responding to the misinformation.

According to yet another aspect, the invention involves a program storage device readable by a machine, tangibly embodying a program of instructions executable by the machine to perform method steps for detecting, and providing a notification of, the existence of misinformation using usage patterns of a network service. The method steps include establishing common usage patterns of the network service, identifying an irregular usage pattern, determining that the irregular usage pattern was caused by misinformation, and responding to the misinformation.

The foregoing and other objects, aspects, features, and advantages of the invention will become more apparent from the following description and from the claims.

BRIEF DESCRIPTION OF FIGURES

In the drawings, like reference characters generally refer to the same parts throughout the different views. Also, the drawings are not necessarily to scale, emphasis instead generally being placed upon illustrating the principles of the invention.

DETAILED DESCRIPTION

The invention relates generally to electronic detection and notification, and more particularly to a web-based system, method, and computer program product for usage based misinformation detection and response for a given organization or entity. The system and method are based essentially on anomaly detection (e.g., the hits on a webpage rising above some number, or creating a pattern, or deviating from the normative pattern). The system and method are used to detect, provide notification of, and respond to misinformation relating to a given organization through analysis of the operation of a server, e.g., an online catalog server.

Figure 1:
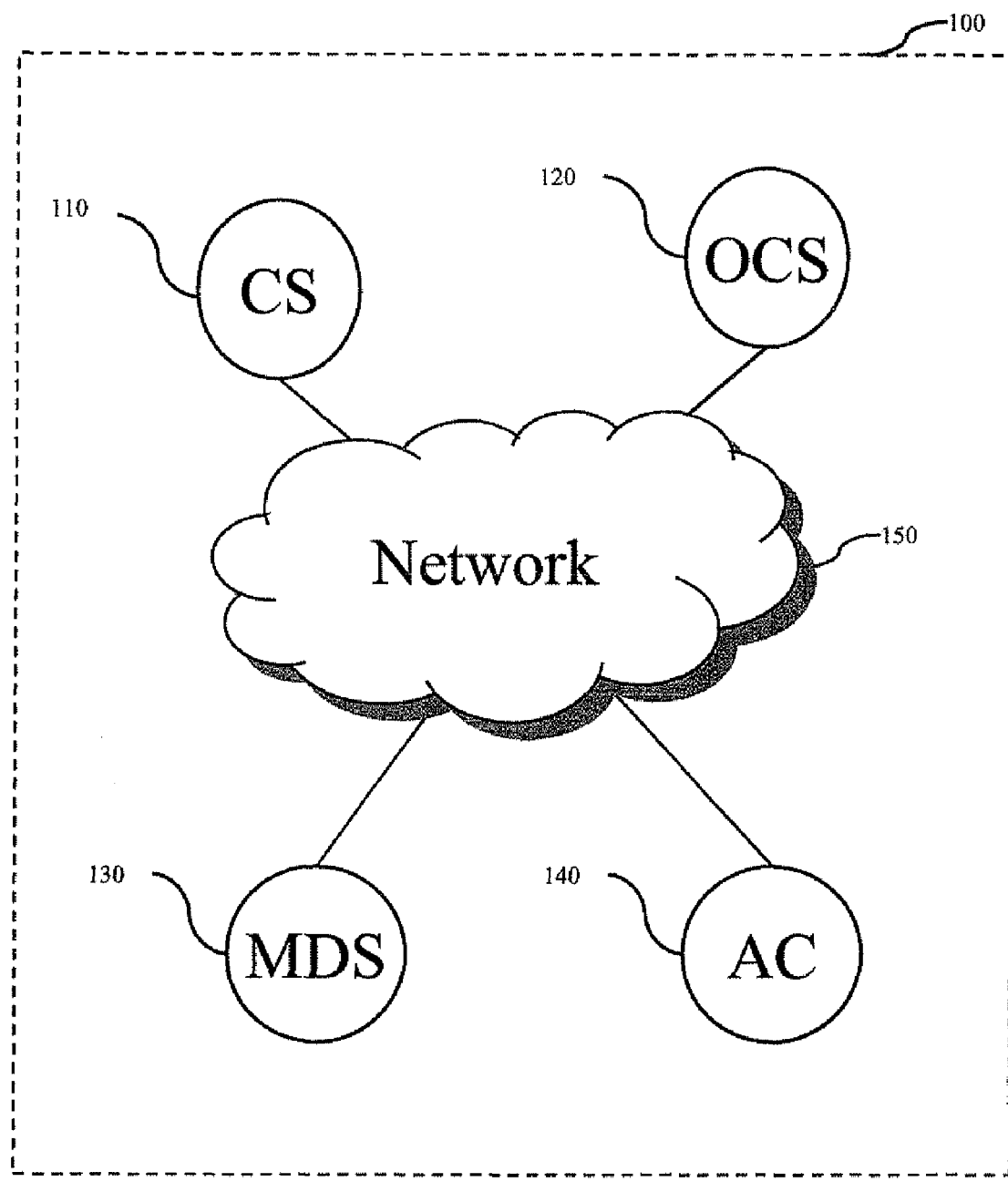
FIG. 1 is an illustrative schematic diagram of a network architecture for a usage-based misinformation detection and response system according to one embodiment of the invention.

Referring to FIG. 1, in one embodiment, a network topology 100 providing an execution environment implementing the functionality of a system for usage-based misinformation detection and response is shown. The network topology 100 includes a Catalog Server (CS) 110, an Online Community Server (OCS) 120, a Misinformation Detection Server (MDS) 130, and an Administrative Client (AC) 140. The CS 110, OCS 120, MDS 130, and the AC 140 are in communication with each other via a network 150. The network 150 includes, but is not limited to: the Internet, an organization's internal intranet, or a public or private wireless or wired telecommunication network.

The Administrative Client 140 enables an authorized user to interact with the Misinformation Detection Server 130 as will be discussed in further detail below. An example of a platform that supports the Administrative Client 140 includes any platform that can act an instant messaging client (i.e., runs an instant messaging client that is compatible with the Instant Messaging Handler 245 shown in FIG. 2) running on the Misinformation Detection Server 130. Such software includes, but is not limited to: America Online Instant Messanger (AOL IM) and IBM Sametime Messaging™. Another example of a platform that supports the Administrative Client 140 includes a platform that can act as web client (i.e., runs a web browser application and can communicate with the Misinformation Detection Server 130 via the network 150). Such software includes, but is not limited to Firefox from the Mozilla Corporation. Still another example of a platform that supports the Administrative Client 140 includes, but is not limited to: an IBM ThinkPad running on a Windows based operating system such as Windows XP, or like operating system. Other contemplated operating systems include Linux™, and Unix based systems.

In other embodiments, clients include network-connectable mobile (i.e., portable) devices such as the Tungsten™ from Palm®, and smart cellular telephones (i.e., devices which function as a cellular telephone and execute network applications, like instant messaging clients and web browsers).

Although only one Administrative Client AC 140 is shown in FIG. 1, in other embodiments, the network topology 100 may include multiple Administrative Clients 140 are included.

Further, while the preferred embodiment includes a Web-based (i.e., HTTP) Administrative Client 140, other forms of network communication are also applicable, such as a sockets-based client/server architecture, e.g., implementing secure sockets layer (SSL) or like network communications protocol. In still other embodiments, the Administrative Client 140 resides on the same machine as the Misinformation Detection Server 130, thereby eliminating the need for any network communication at all.

The Catalog Server 110 allows online end-users to search for and retrieve information regarding an organization's products. Examples of platforms that support the Catalog Server 110 include, but are not limited to: an IBM PowerPC™ running AIX®, the IBM WebSphere™ HTTP Server, which handles the communication to and from end-users, and IBM's DB2 database server product, which handles the storage and search of product-related information.

Although the Catalog Server 110 is included in the preferred embodiment, in other embodiments, other network-accessible servers are used, such as a standard web server, a chat server, a network news transfer protocol (NNTP) news server, an online meeting server, or an online transaction server.

The Online Community Server 120 provides an online community meeting utility where users can discuss with each other one or more issues via their computers, or like computing system platform (e.g., PDA). Examples of platforms that support the Online Community Server 120 include, but are not limited to: an IBM Workstation running Windows XP® with an AOL IM service or a Domino newsgroup service (NNTP).

Figure 2:
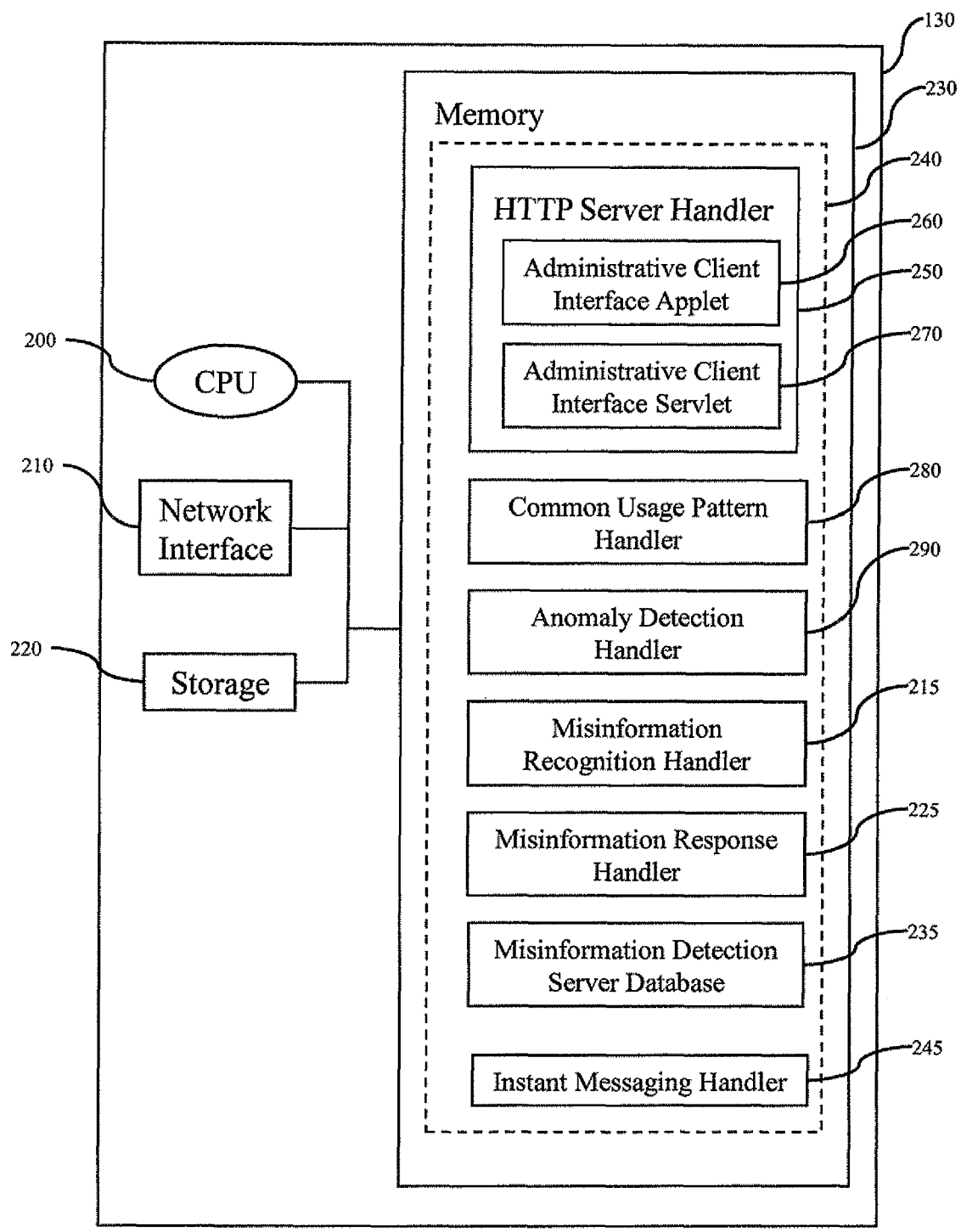
FIG. 2 is an illustrative block diagram of a Misinformation Detection Server according to one embodiment of the invention.

Referring to FIG. 2, in one embodiment, a block diagram of the Misinformation Detection Server 130 is shown. The Misinformation Detection Server 130 is a computing node that acts as an HTTP server. The Misinformation Detection Server 130 includes a CPU 200, a network interface 210, and a storage device 220 such as a disk or data access storage device (DASD), and memory 230, such as RAM. The network interface 210 allows the Misinformation Detection Server 130 to communicate with other network connected nodes via the network 150. Such interfaces include, but are not limited to: Ethernet, and wireless IP (e.g., LEAP, CDMA or WAP). In the present embodiment, the Misinformation Detection Server 130 also includes Misinformation Detection Server logic 240, which is embodied as computer executable code that is loaded into memory 230 (for execution by CPU 200) from a remote source (e.g., over the network 150 via the network interface 210), local permanent optical (DVD-ROM), or from the storage device 220 (e.g. disk or DASD).

The Misinformation Detection Server logic 240 stored in the memory 230 includes an HTTP Server Handler 250, which includes an Administrative Client Interface Applet 260 and an Administrative Client Interface Servlet 270. The Misinformation Detection Server logic 240 further includes a Common Usage Pattern Handler 280, an Anomaly Detection Handler 290, a Misinformation Recognition Handler 215, a Misinformation Response Handler 225, a Misinformation Detection Server Database 235, and an Instant Messaging Handler 245.

The HTTP Server Handler 250 is an application that can respond to HTTP communications, including, but not limited to: the WebSphere™ product sold by IBM.

The Administrative Client Interface Applet 260 and Administrative Client Interface Servlet 270 together enable an authorized end-user to communicate with the Common Usage Pattern Handler 280, the Anomaly Detection Handler 290, the Misinformation Recognition Handler 215, and the Misinformation Response Handler 225. When the end-user wants to interact with the Misinformation Detection Server 130, the end-user first downloads the Administrative Client Interface Applet 260 to a web browser running on their Administration Client 140. To download the Administrative Client interface Applet 260, the end-user must provide sufficient credentials (e.g., user ID and password).

After the Administrative Client Interface Applet 260 has been downloaded and enabled, the Administrative Client Interface Applet 260 communicates directly with the Administrative Client Interface Servlet 2070, which is executing in the HTTP Server Handler 250. The HTTP server Handler 250, in turn, communicates locally with the other handlers 280, 290, 215, 225, 245 executing on the server 130. Skilled artisans will recognize that this applet/servlet pairing is well known in the art (e.g., see Jason Hunter with William Crawford, Java Servlet Programming (Sebastopol, Calif: O'Reilly & Associates, Inc., 1988), pp. 277-337). Skilled artisans will also appreciate that the communication between the Administration Client 140 and the handlers 280, 290, 215, 225, 245, in other embodiments can be implemented using simple socket-based applications.

The Misinformation Detection Server Database 235 allows the Misinformation Detection Server 130 to store, modify, and delete data related to misinformation, usage patterns, users, and online community servers. A detailed description of the information maintained by the Misinformation Detection Server Database 235 is given below. The Misinformation Detection Server Database 235 can be implemented using database tools such as the DB/2 product sold by IBM, and like database platforms. One with skill in the art will appreciate that in other embodiments, the Misinformation Detection Server Database 235 can be a service that runs on another server and accessed by the Misinformation Detection Server 130 via the network 150.

The Instant Messaging Handler 245 allows the Misinformation Detection Server 130 to send messages synchronously to the Administration Client 140. Products providing this service include, but are not limited to: AOL IM and IBM Sametime Messaging. Skilled artisans will appreciate that other messaging applications, in other embodiments, are also applicable and include, but are not limited to: a specialized hard-coded socket-based application, the only constraint on which being that this application is compatible with the messaging client running on the Administration Client 140.

The Common Usage Pattern Handler 280 determines the common usage patterns of the Catalog Server 110. Such patterns include, but are not limited to: the rate of requests, the number of requests during particular time periods (e.g., mornings, work hours (Monday-Friday, 9:00-5:00), weekends), the types of requests (e.g., request for a particular type of network server product, or language translation products), known pulses (e.g., extremely high rate of requests weekdays at lunchtime) and idle time (e.g. periods during the middle of the night when few or no requests are received), known content, and minimum, maximum, average, and mean usage levels. A means of obtaining such usage patterns includes, but is not limited to: retrieving the request log from the Catalog Server 110, and then analyzing the frequency and content patterns of the requests, or checking for correlations between specific activity and patterns of activity to reveal misinformation. Typical correlations include actions of a particular user, numerous searches for a particular topic, searches that fail to return any results, action level or content in a third party service, reduced or low levels of one or more activities, or hits from a particular source.

All usage patterns determined by the Common Usage Pattern Handler 280 are stored in the Misinformation Detection Server Database 235, and can be later searched and retrieved.

The Common Usage Pattern Handler 280 also accepts and stores usage patterns identified and entered manually. Such data is entered by an authorized end-user using the Administrative Client Interface Applet 260, which communicates through the Administrative Client Interface Servlet 270 with the Common Usage Pattern Handler 280. Such data might include indications of when particular types of end-users access the Catalog Server 110 (e.g., beginners and amateurs tend to post queries evenings and weekends, while experts and professionals tends to make their queries during work hours). Similar to the automatically collected usage patterns, manually entered usage patterns are also stored in the Misinformation Detection Server Database 235 for use in accordance with the invention.

The Anomaly Detection Handler 290 monitors the activity of the Catalog Server 10 and reports any usage patterns to the Misinformation Recognition Handler 215 whenever a usage pattern is identified that does not match the Catalog Server's 110 common usage patterns, which have been previously stored in the Misinformation Detection Server Database 235 by the Common Usage Pattern Handler 280. For example, if the Anomaly Detection Handler 290 determines that the number of failed product searches (i.e., searches for products the organization does not produce) is one-thousand per hour, and subsequently determines from the Misinformation Detection Server Database 235 that the common average number of failed product searches is only one-hundred per hour, the Anomaly Detection Handler 290 will notify the Misinformation Recognition Handler 215 of the discrepancy.

In the preferred embodiment, the Anomaly Detection Handler 290 monitors the usage patterns of the Catalog Server 110 by retrieving and analyzing the Catalog Server's 110 request log. Skilled artisans will appreciate that, in other embodiments, other usage monitoring techniques exist, including the Catalog Server 110 supplying a usage reporting servlet, which the Anomaly Detection Handler 290 could consult for reports of the latest usage. Skilled artisans will also appreciate that the anomalous usage patterns could also include unexpectedly low user rates. An example of a low user rate would be when a new product was announced and virtually no requests for the new product were received by the Catalog Server 110. Such a situation could arise from misinformation it for example, after the existence of the product was announced, misinformation was posted claiming the product included a computer virus.

A skilled artisan will appreciate that, in addition to monitoring incoming requests, the Anomaly Detection Handler 290 could also include a module that tries to discover anomalies a priori. This module would check every web page retrieved for it by a web crawler for errors. These errors could include references to Catalog Server 110 URLs that do not exist, or to products that the organization does not (or no longer) produce. The Catalog Server 110 reference errors could thus be caught, even without any requests being made to the Catalog Server 110. The Catalog Server 110 reference errors could also include unauthorized use of organization logos and trademarks. A list of all authorized users may be maintained in the Misinformation Detection Server Database 235. A method for checking for trademarks and logos includes, but is not limited to, text and picture matching.

The present invention also enables an authorized end-user to post a usage pattern to the Anomaly Detection Handler 290. For example, to report use that the end-user thinks maybe anomalous, the end-user uses the Administrative Client Interface Applet 260 executing on the Administrative Client 140 to communicate the usage pattern in question to the Anomaly Detection Handler 290 via the Administrative Client Interface Servlet 270. Once received, the usage pattern is checked and processed like data retrieved by the Anomaly Detection Handler 290 via the automatic monitoring method described above. Skilled artisans will appreciate that, in other embodiments, users can be assigned responsibly for particular sections of the Catalog Server 110 usage patterns. For example, a first user is responsible for monitoring hardware products, while a second user is responsible for monitoring software products, and a third user is responsible for monitoring documentation products. Further, these responsibilities could be handled in work shifts so as to allow sharing of the workload. For example, the first user is responsible for monitoring Catalog Server 110 usage patterns related to hardware products on weekdays, while a fourth user is responsible for monitoring the Catalog Server 110 usage patterns related to hardware products on weekends.

Referring again to FIG. 2, for a given usage pattern (e.g., an anomalous usage pattern identified by the Anomaly Detection Handler 290), the Misinformation Recognition Handler 215 determines whether the usage pattern was caused by misinformation or by another cause (e.g., a computer virus or a network denial of service attack). The Misinformation Recognition Handler 215 accomplishes this task by using one or more of the following techniques.

The Misinformation Recognition Handler 215 checks whether the usage pattern consists of requests for products or services not provided by the organization. For example, a company receives numerous requests concerning spamming (i.e., sending junk advertising via email) and spammers (i.e., generators of spam) based on misinformation that indicated that the company's product generates and sends junk email to known spammers when, in fact, the product does not send junk email to spammers.

The Misinformation Recognition Handler 215 also checks whether the source of the usage is from a known source of misinformation including, but not limited to: a particular end-user, an Internet domain (e.g., a rival or hostile company, country, or organization), or an online community, such as the Online Community Server 120 (e.g., a news or chat group).

The Misinformation Recognition Handler 215 also queries one or more local domain experts to determine if the usage seems to be based on misinformation. The Misinformation Recognition Handler 215 contacts the domain export using email or instant messaging modality. Subsequently, the domain expert replies to the Misinformation Recognition Handler 215 using the Administrative Client Interface Applet 260 executing on the Administrative Client 140 to communicate a response to the Misinformation Recognition Handler 215 via the Administrative Client Interface Servlet 270.

The Misinformation Recognition Handler 215 determines if the usage is centered on requests for a URL that does not exist (e.g., requests to the Catalog Server 110 for a URL that does not exist). This usage pattern would result from misinformation that indicates the Catalog Server 110 does provide the given URL.

The Misinformation Recognition Handler 215 determines if a given anomalously high usage rate (e.g., requests for a given product) coincides with a high usage rate in another known and possibly malicious, online service (e.g., the Online Community Server 120).

The Misinformation Response Handler 225 responds to misinformation once it has been identified by the Misinformation Recognition Handler 215 by using one or more of the techniques described below.

The Misinformation Response Handler 225 provides a web page, which provides a clear indication that the service being requested (e.g., service that spams spammers) is not produced by the current organization, or that the product being requested does not provide the given service (e.g., a company's product does not spam spammers).

The Misinformation Response Handler 225 provides a URL that indicates that the URL being requested is erroneous and based on misinformation.

The Misinformation Response Handler 225 sends requests to the source of the misinformation demanding that the misinformation be retracted. This includes, but is not limited to: sending an email or standard (hardcopy) letter to the associated offending end-user, or posting an entry on the offending online community service (e.g., the Online Community Server 120).

The Misinformation Response Handler 225 sends notices to local organization domain experts reporting that the misinformation exists and needs to be handled.

The Misinformation Response Handler 225 posts an explanation regarding the misinformation on an online news or discussion service (e.g., posting on the discussion service running on the Online Community Server 120).

Figure 3:
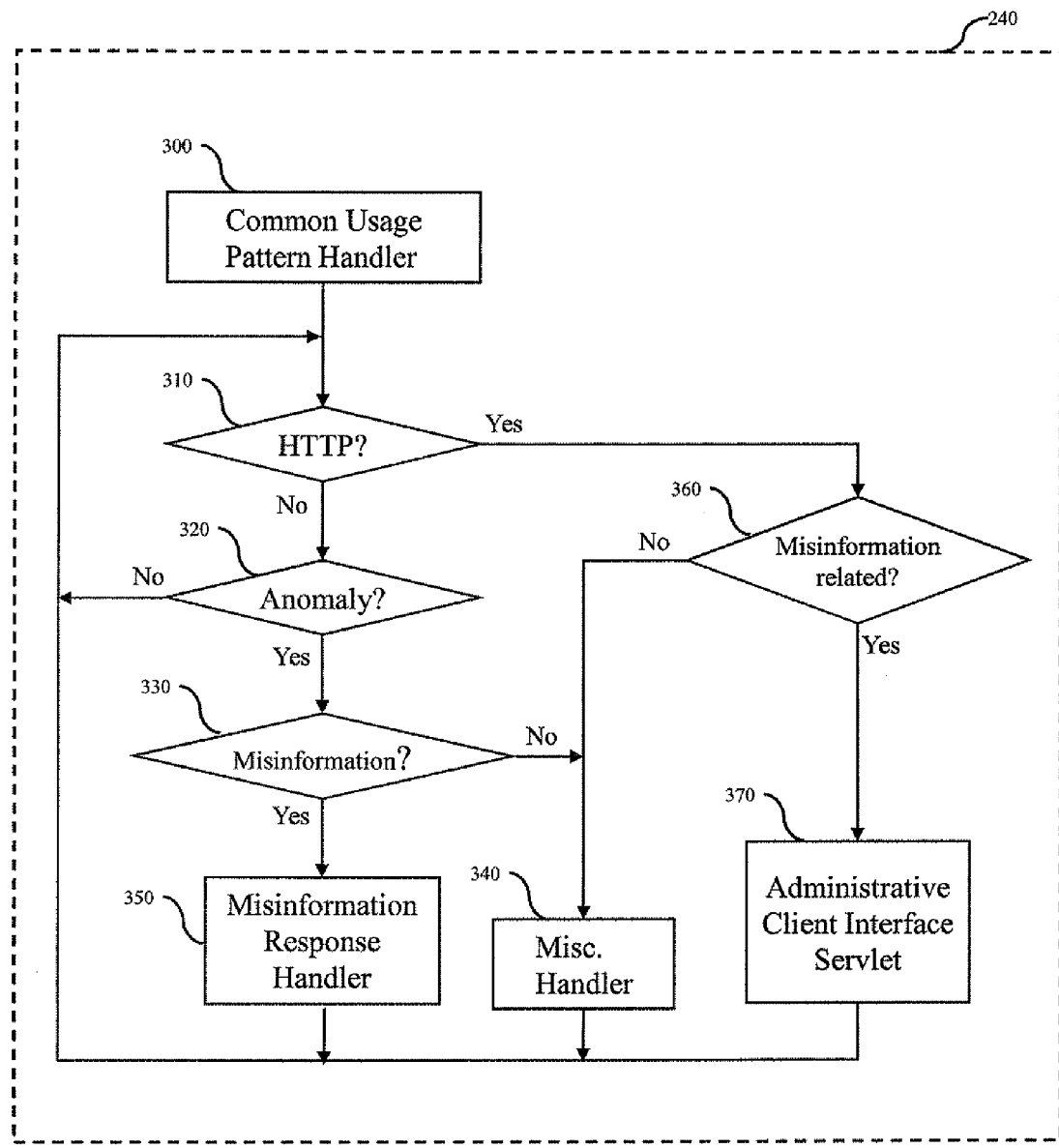
FIG. 3 is an illustrative flow diagram of the operation of a Misinformation Detection Server according to one embodiment of the invention.

Referring to FIG. 3, in one embodiment, a detailed flow diagram of the operation of the Misinformation Detection Server logic 240 is shown. The Misinformation Detection Server 130 first calls the Common Usage Pattern Handler 280 to determine the common usage patterns of the Catalog Server 110 (Step 300). The Misinformation Detection Server Logic 240 then checks whether there is an HTTP request that must be processed (Step 310). If there is an HTTP request that needs to be processed, then the request is checked to determine whether the request is related to misinformation (Step 360). If the request is related to misinformation, then the request is passed to the Administrative Client Interface Servlet 270 (Step 370). Thereafter, the Misinformation Detection Server Logic 240 again checks whether there is an HTTP request that must be processed (return to Step 310). If the request is not related to misinformation, then the request is passed to another miscellaneous handler for processing, the description of which is beyond the scope of this invention (Step 340). Thereafter, the Misinformation Detection Server Logic 240 again checks whether there is an HTTP request that must be processed (return to Step 310).

Returning to Step 310, if the Misinformation Detection Server Logic 240 determines that there are no pending HTTP requests, the Anomaly Detection Handler 290 determines if there are any anomalous usage patterns to check (Step 320). If there are no anomalous usage patterns to check, the Misinformation Detection Server Logic 240 again checks whether there is an HTTP request that must be processed (return to Step 310). If there is an anomalous usage pattern to check, the anomalous usage pattern is passed to the Misinformation Recognition Handler 215 to determine if the anomalous usage pattern was caused by misinformation (Step 330). If the Misinformation Recognition Handler 215 determines that the anomalous usage pattern was caused by misinformation, the anomalous usage pattern is passed to the Misinformation Recognition Handler 225 (Step 350). Thereafter, the Misinformation Detection Server Logic 240 again checks whether there is an ITTP request that must be processed (return to Step 310). If the Misinformation Recognition Handler 215 determines that the anomalous usage pattern was not caused by misinformation, the anomalous usage pattern is passed to another miscellaneous handler for further processing in a manner which is beyond the scope of this invention (Step 340). Thereafter, the Misinformation Detection Server Logic 240 again checks whether there is an HTTP request that must be processed (return to Step 310).

Figure 4:
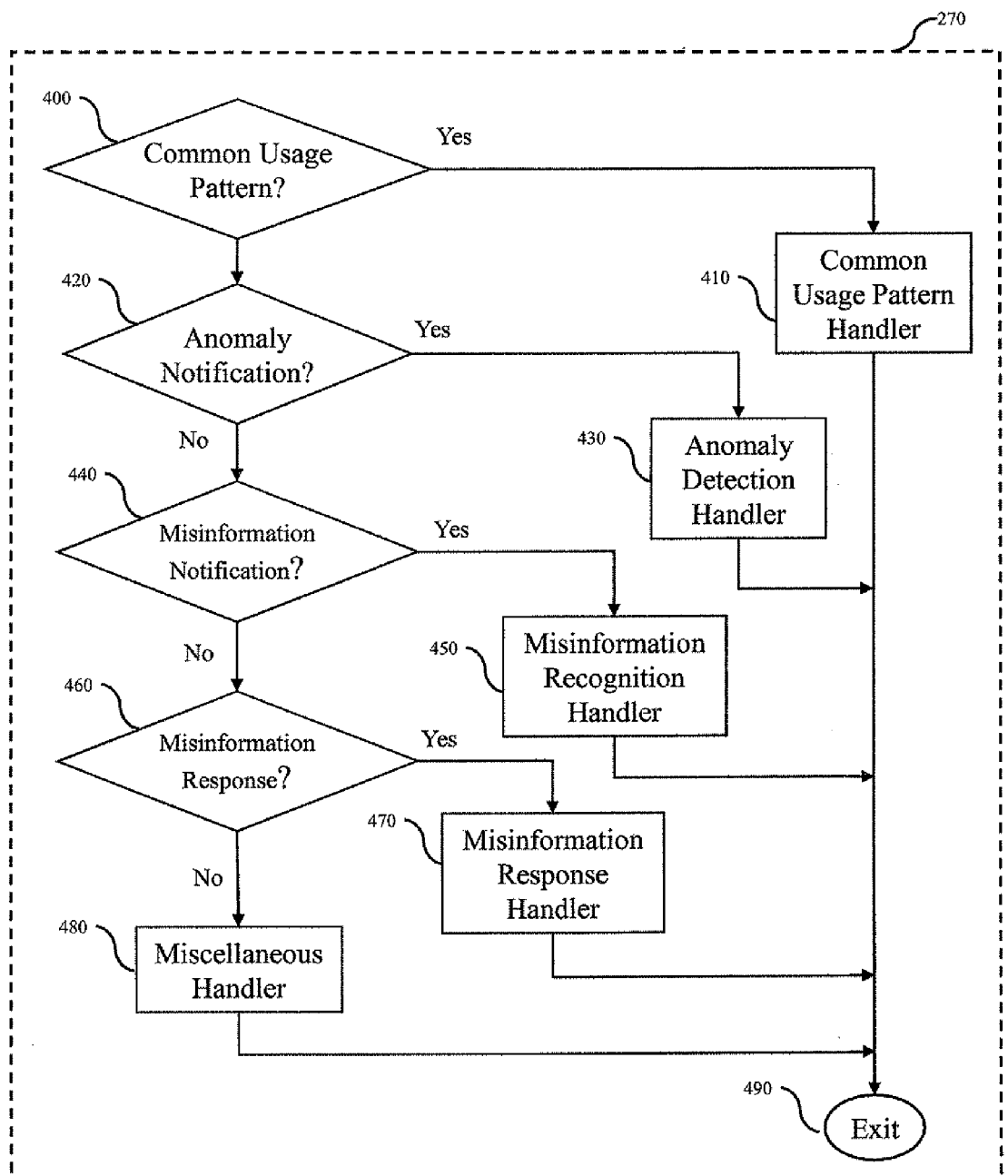
FIG. 4 is an illustrative flow diagram of the operation of an Administrative Client Interface Servlet according to one embodiment of the invention.

Referring to FIG. 4, in one embodiment, a detailed flow diagram of the operation of the Administrative Client Interface Servlet 270 (see Step 370 of FIG. 3) is shown. The Administrative Client Interface Servlet 270 allows an authorized user to interact with Misinformation Detection Server 130 using the Administrative Client Interface Applet 260 executing in a web browser on a network node (e.g., the Administrative Client 140). In the embodiment, any given HTTP request from the Administrative Client Interface Applet 260 is directed to the Administrative Client Interface Servlet 270 by the HTTP Server Handler 250.

The Administrative Client Interface Servlet 270 then passes the given request to either the Common Usage Pattern Handler 280 (e.g., when an authorized user is providing common usage patterns), the Anomaly Detection Handler 290 (e.g., when an authorized user is providing a manually detected anomalous usage pattern), the Misinformation Recognition Handler 215 (e.g., when an authorized used is providing a manual determination that a given anomalous usage pattern was caused by misinformation), or the Misinformation Response Handler 225 (e.g., if an authorized used is specifying how and to whom the Misinformation Detection Server 130 should respond to with the given misinformation incident).

The HTTP request is checked to determine whether the HTTP request is intended for the Common Usage Pattern Handler 280 (Step 400). If so, then the HTTP request is passed to the Common Usage Pattern Handler 280 (Step 410). Thereafter, the Administrative Client Interface Servlet 270 returns control to the Misinformation Detection Server Logic 240 (Step 490). The Misinformation Detection Server Logic 240 again checks whether there is an HTTP request that must be processed (return to Step 310 in FIG. 3). If the HTTP request is not intended for the Common Usage Pattern Handler 280, then the HTTP request is checked to determine if it is intended for the Anomaly Detection Handler 290 (Step 420). If so, then the HTTP request is passed to the Anomaly Detection Handler 290 (Step 430). Thereafter, the Administrative Client Interface Servlet 270 returns control to the Misinformation Detection Server Logic 240 (Step 490).

If the HTTP request is not intended for the Anomaly Detection handler 290, then the request is checked to determine if it is intended for the Misinformation Recognition Handler 215 (Step 440). If so, then the HTTP request is passed to the Misinformation Recognition Handler 215 this handler 215 (Step 450). Thereafter, the Administrative Client Interface Servlet 270 returns control to the Misinformation Detection Server Logic 240 (Step 490). If the HTTP request is not intended for the Misinformation Recognition Handler 215, then the request is checked to determine if it is intended for the Misinformation Response Handler 225 (Step 460). If so, then the HTTP request is passed to the Misinformation Response Handler 225 (Step 470). Thereafter, the Administrative Client Interface Servlet 270 returns control to the Misinformation Detection Server Logic 240 (Step 490). If the HTTP request is not intended for the Misinformation Response Handler 225, then the request is passed to a miscellaneous handler for further processing in a manner which is beyond the scope of this invention (Step 480). Thereafter, the Administrative Client Interface Servlet 270 returns control to the Misinformation Detection Server Logic 240 (Step 490).

Figure 5:
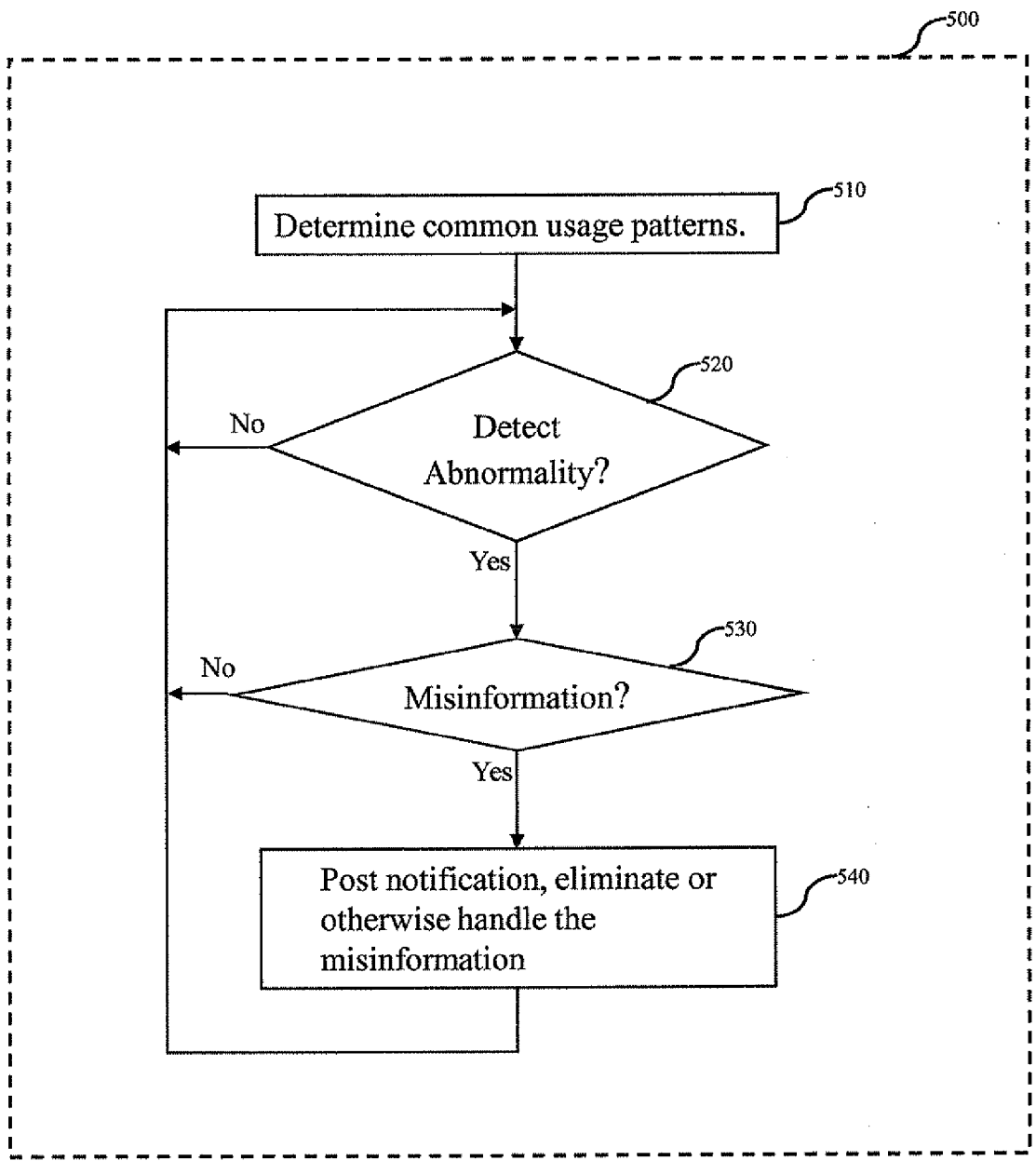
FIG. 5 is an illustrative flow diagram of the operation of the Misinformation Detection System according to one embodiment of the invention.

Referring to FIG. 5, in one embodiment, a flow diagram of the operation of the Misinformation Detection System 100 is shown. The described misinformation detection method begins executing as soon as the Misinformation Detection Server 130 is started and continues executing until the Misinformation Detection Server 130 is shut down.

The Common Usage Pattern Handler 280 first determines the common usage patterns of the Catalog Server 110 (Step 510). The data included in these usage patterns includes, but is not limited to: data obtained programmatically by the Common Usage Pattern Handler 280, as well as patterns entered manually by authorized users via the Administrative Client Interface Servlet 270. All such patterns are saved in the Misinformation Detection Server Database 235 by the Common Usage Pattern Handler 280.

The Anomaly Detection Handler 290 monitors the usage patterns of the Catalog Server 110. Note that an authorized user can post a usage pattern (a usage pattern that the user considers suspect) to the Anomaly Detection Handler 290 via the Administrative Client Interface Servlet 270. When a usage pattern is identified, the Anomaly Detection Handler 290 checks to determine if the usage pattern is an anomalous usage pattern that should be dealt with (Step 520). If the usage pattern is not anomalous, then control returns to the Anomaly Detection Handler 290, which again monitors the usage patterns of the Catalog Server 110. The Anomaly Detection Handler 290 continues to monitor usage patterns until a usage pattern is detected or reported.

If the usage pattern is determined to be anomalous, the usage pattern is checked to determine whether the usage pattern was caused by misinformation (Step 530). If the usage pattern was not caused by misinformation, then control returns to the Anomaly Detection Handler 290, which again monitors the usage patterns of the Catalog Server 110. This determination is made either automatically by the Misinformation Recognition Handler 215 or with the guidance of an authorized user. Skilled artisans will appreciate that the Misinformation Recognition Handler 215 could send a request via the Instant Messaging Handler 245, shown in FIG. 2, to the authorized user to have the user make the determination. The user can return a decision to the Misinformation Recognition Handler 215 via the Client Interface Servlet 270.

If the anomalous usage pattern is determined to have been caused by misinformation, then the usage pattern is passed to the Misinformation Response Handler 225 (Step 540). The Misinformation Response Handler 225 responds as previously described with respect to FIG. 2. Thereafter, control returns to the Anomaly Detection Handler 290, which again monitors the usage patterns of the Catalog Server 110.

A skilled artisan will also appreciate that additional common and anomalous usage patterns can be used by the current invention if the Catalog Server 110 employs a state-maintaining mechanism, such as HTTP cookies. Anomalous usage patterns include multi-request sessions. For example, analysis of the cookies employed by the Catalog Server 110 would allow the current invention to track not only that a given user made a given request at a given time, but also when this user created an authorized session with the Catalog Server 110, and how long the session was active. Moreover, the user's session preferences (e.g., costs limits) could also be tracked.

A skilled artisan will appreciate that a service organization could utilize the current invention to provide a service to a customer organization. The service includes, but is not limited to: providing and maintaining a Misinformation Detection Server 130, and providing users with ability to perform the functions discussed herein. These functions include providing usage patterns, notifying of anomalous usage patterns, determining whether not a given usage pattern is based on misinformation, and providing responses to misinformation incidents. The service further includes teaching members of the customer organization to perform one or more of the duties performed by an authorized user who works through the Administrative Client interface applet 260 and the Administrative Client interface servlet 270. A skilled artisan will farther appreciate that the service organization could charge the customer organization for the provision of the services described above.

Variations, modifications, and other implementations of what is described herein may occur to those of ordinary skill in the art without departing from the spirit and scope of the invention. Accordingly, the invention is not to be defined only by the preceding illustrative description.

What is claimed is:

1. A computer-implemented method of detecting abnormal use of a network service caused by misinformation, comprising:
   determining common usage patterns for the network service and storing said common usage patterns in a memory storage device associated with a processor device;
   supplying, by said network service, a servlet reporting current usage patterns of said network service to a server device having programmed detector component to handle and detect anomalies;
   automatically monitoring, by said programmed detector component, the current usage patterns of said network service to detect abnormal usage patterns by comparing the current usage patterns with said common usage patterns;
   upon detecting an abnormal usage pattern, determining if the abnormal usage patterns were caused by misinformation by automatically checking for correlations between specific usage activity of users of said network service and an action level of users of a third party online discussion forum to reveal misinformation;
   upon determining that said online discussion forum is a source of the misinformation,
   responding to the source of the misinformation by posting an entry in said online discussion forum explaining the misinformation.

2. The method of claim 1, wherein responding to the source of the misinformation comprises:
   asking the source of misinformation for correction or retraction; notifying a group responsible for public relations, CRM, or product branding of misinformation so that the group reacts.

3. The method of claim 1, wherein the common usage patterns comprises known pulses and idle time, known content, and maximum, minimum, average and mean usage levels.

4. The method of claim 1, wherein misinformation comprises a false quote, a false fact, or a false URL.

5. The method of claim 1, wherein abnormal usage pattern comprises requests for a non-existent URL.

6. The method of claim 1, wherein abnormal usage pattern comprises a large number of searches for a particular product within the network service, which do not match any of the network service's product offerings.

7. The method of claim 1, wherein different programmed detector components monitor different aspects of the network service.

8. The method of claim 1, wherein specific third party services are checked for usage indicating misinformation.

9. The method of claim 1, wherein activities of a specific user are checked for behavior indicating misinformation.

10. The method of claim 1, wherein correlations comprise one or more of:
    actions of a particular user;
    numerous searches for a particular topic;
    searches that fail to return any results;
    content in said third party service;
    reduced or low levels of one or more activities; or
    hits from a particular source.

11. The method of claim 1, wherein the network service comprises one or more online servers.

12. A program storage device readable by a machine, tangibly embodying a program of instructions executable by the machine to perform method steps for detecting, and providing a notification of, existence of misinformation using usage patterns of a network service, comprising:
    establishing common usage patterns of the network service and storing said common usage patterns in a memory storage device associated with a processor device;
    supplying, by said network service, a servlet reporting current usage patterns of said network service to a server device having a programmed detector component to handle and detect anomalies;
    automatically identifying, by said programmed detector component, an irregular usage pattern patterns by comparing the current usage patterns with said common usage patterns;
    upon detecting an irregular usage pattern, determining that the irregular usage pattern was caused by misinformation by automatically checking for correlations between specific usage activity of users of said network service and an action level of users of an online discussion forum to reveal misinformation;

upon determining that said online discussion forum is a source of the misinformation, responding to the source of the misinformation by posting an entry in said online discussion forum explaining the misinformation.

13. A system for detecting, and providing a notification of, the existence of misinformation using usage patterns of a network service, comprising: a memory;

a processor in communications with the memory, wherein the processor is capable of performing a method comprising:

establishing common usage patterns of the network service and storing said common usage patterns in a memory storage device associated with a processor device;

supplying, by said network service, a servlet reporting current usage patterns of said network service to a server device having programmed detector component to handle and detect anomalies;

automatically identifying, by said programmed detector component, an irregular usage pattern by comparing the current usage patterns with said common usage patterns;

upon detecting an irregular usage pattern, determining that the irregular usage pattern was caused by misinformation by automatically checking for correlations between specific usage activity of users of said network service and an action level of users of an online discussion forum to reveal misinformation; and upon determining that said online discussion forum is a source of the misinformation, responding to the source of the misinformation by posting an entry in said online discussion forum explaining the misinformation.

14. The program storage device of claim 12, wherein said correlations comprises: numerous searches for a particular product within the network service which do not match any of the network service's product offerings.

15. The system of claim 13, wherein said correlations comprises: numerous searches for a particular product within the network service which do not match any of the network service's product offerings.

16. The method of claim 1, further providing:

posting, by an end-user, via an interface to an anomaly detection handler component, a usage pattern to report an anomalous use of said network service as determined by the end-user; and, monitoring, by said anomaly detection handler component, the activity of the network service for said posted usage pattern.

17. The method of claim 1, wherein said correlations comprise: an unexpected low user rate of requests by users against said network service after a new product availability.

18. The system of claim 13, wherein said correlations comprise: an unexpected low user rate of requests by users against said network service after a new product availability announcement.

19. The program storage device of claim 1, wherein said correlations comprise: an unexpected low user rate of requests by users against said network service after a new product availability announcement.

* * * * *